United States Patent [19]

Martinez-Corral

[11] Patent Number: 4,655,333
[45] Date of Patent: Apr. 7, 1987

[54] CLUTCH, IN PARTICULAR FOR AUTOMOBILE VEHICLES

[75] Inventor: Cecilio Martinez-Corral, Madrid, Spain

[73] Assignee: Valeo, Paris, France

[21] Appl. No.: 733,388

[22] Filed: May 13, 1985

[30] Foreign Application Priority Data

May 15, 1984 [FR] France ................................ 84 07467

[51] Int. Cl.⁴ ........................ F16D 13/46; F16D 13/60
[52] U.S. Cl. ................................ 192/70.27; 192/70.18; 192/89 B
[58] Field of Search ................ 192/70.27, 70.28, 89 B, 192/70.18

[56] References Cited

U.S. PATENT DOCUMENTS

| 2,174,317 | 9/1939 | Dunkelow | 192/70.29 |
| 3,340,973 | 9/1967 | Maucher | 192/89 B X |
| 3,489,256 | 1/1970 | Binder et al. | 192/89 B X |
| 3,583,537 | 6/1971 | Spannagel | 192/70.27 X |
| 3,977,504 | 8/1976 | Kajitani | 192/89 B |
| 4,238,018 | 12/1980 | Maucher | 192/89 B X |

FOREIGN PATENT DOCUMENTS

| 2931816 | 2/1981 | Fed. Rep. of Germany . | |
| 1422552 | 11/1965 | France . | |
| 2059206 | 5/1971 | France . | |
| 2525934 | 11/1983 | France . | |
| 1233996 | 6/1971 | United Kingdom | 192/70.28 |
| 1327774 | 8/1973 | United Kingdom . | |
| 1435908 | 5/1976 | United Kingdom . | |
| 2056591 | 3/1981 | United Kingdom | 192/89 B |

*Primary Examiner*—Rodney H. Bonck
*Assistant Examiner*—David A. Testardi
*Attorney, Agent, or Firm*—Charles E. Brown; Charles A. Brown

[57] ABSTRACT

A clutch suitable for automobile vehicles has a reaction plate which rotates with a first shaft, a friction disk which rotates with a second shaft and a pressure plate which rotates with the reaction plate and is movable axially relative to it. An axially acting elastic member urges the pressure plate towards the reaction plate. The elastic member bears on bearing members fastened to the reaction plate in the axial direction and is the circumferentially continuous part of a diaphragm Belleville spring. The bearing members are made from a plurality of distinct circumferentially elongate segments distributed circumferentially around the axis of the clutch. Each is individually attached to the reaction plate.

9 Claims, 3 Drawing Figures

CLUTCH, IN PARTICULAR FOR AUTOMOBILE VEHICLES

BACKGROUND OF THE INVENTION

1. Field of the Invention

The present invention is generally concerned with clutches and is more particularly directed to those designed to be fitted to automobile vehicles.

2. Description of the Prior Art

As is known, a clutch of this kind generally comprises a first plate, called the reaction plate or flywheel, which is designed to be constrained to rotate with a first shaft, in general a driving shaft, in practice the motor output shaft in the case of an automobile vehicle, a friction disk which is designed to be constrained to rotate with a second shaft, in general a driven shaft, in practice the input shaft of the gearbox in the case of an automobile vehicle, a second plate called the pressure plate constrained to rotate with the reaction plate and mounted axially mobile relative to the latter, axially acting elastic means adapted to urge the pressure plate towards the reaction plate in order to clamp the latter and thus engage the clutch, and bearing means which, fast with the reaction plate in the axial direction, provide axial bearing support to said axially acting elastic means.

At present, the axially acting elastic means are more often that not formed by the circumferentially continuous part, forming a Belleville spring, of a generally annular part commonly called the diaphragm spring, the central part of which is to this end divided into radial fingers by slots and conjointly forms means adapted to command disengagement of the clutch when acted on by a control member, commonly called the clutch release bearing, itself governed by a control available to the user.

More often that not the bearing means associated with the axially acting elastic means are themselves formed by a generally annular and circumferentially continuous part commonly called the cover.

This applies both when, in order to command disengagement of the clutch, the control member associated with the diaphragm spring must push on the latter, that is to say operate in the axial direction towards the reaction plate and when, in order to command such disengagement, the control member associated with the diaphragm spring must pull on the latter, that is to say operate in the axial direction away from the reaction plate, although in this case the diaphragm spring is not necessarily fastened to the cover in such a way that it can flex, but merely bears against the latter, so that the cover may be reduced to a ring, as in the clutch described in French Pat. No. 1 422 552.

At present it is generally accepted that, for it to operate under good conditions, the diaphragm spring must be substantially continuously supported in the circumferential direction on the bearing means associated with it for this purpose.

The present invention is based on the initially surprising observation that, contradicting this received wisdom, it is possible that advantage to provide non-continuous bearing support for the diaphragm spring.

SUMMARY OF THE INVENTION

The present invention consists in a clutch comprising a reaction plate adapted to be constrained to rotate with a first shaft, a friction disk adapted to be constrained to rotate with a second shaft, a pressure plate constrained to rotate with and movable axially relative to said reaction plate, axially acting elastic means adapted to urge said pressure plate towards said reaction plate, and bearing means fast with said reaction plate in the axial direction on which said axially acting elastic means bear axially, wherein said axially acting elastic means comprise the circumferentially continuous part of a diaphragm spring constituting a Belleville spring and said bearing means comprise a plurality of distinct, circumferentially elongate segments distributed circumferentially around the axis of the clutch and each individually attached to said reaction plate.

In practice, the circumferential distance between the segments is greater than their legnth in the circumferential direction.

Be this as it may, the arrangement in accordance with the invention which is more particularly suited to the situation in which, in order to disengage the clutch, the control member associated with the diaphragm spring must pull on the latter, gives numerous advantages.

First of all, it provides for a non-negligible saving in material, and thus in weight and inertia.

Also, it enables the clutch to be effectively ventilated.

Finally, when the bearing means associated with the diaphragm spring ensure centering of the latter, in the usual way, such centering is easier to control to the extent that it concerns only a limited number of points, equal to the number of segments employed to constitute the bearing means.

In French Pat. No. 2 059 206 the bearing means for the axially acting elastic means are also circumferentially subdivided. However, these are screw heads and not circumferentially elongate segments, the explicit objective of the proposed arrangement being to provide for the elimination of any form of cover; furthermore, this arrangement entails the use of a specific non-standard diaphragm spring provided with notched lugs at its periphery, whereby its periphery is not circumferentially continuous.

Similarly, although in U.S. Pat. No. 2,174,317 it is proposed to use bars to constitute the required bearing means, the axially acting elastic means concerned are not constituted by the circumferentially continuous part forming a Belleville spring of a diaphragm spring, but by ordinary springs for which, given the circular contour of their cross-section, it is totally immaterial whether such bars extend circumferentially or not.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

The figures illustrate by way of example the application of the invention to a clutch 10 of the pull type, that is to say a clutch to which traction is applied to disengage it.

Figure 1:
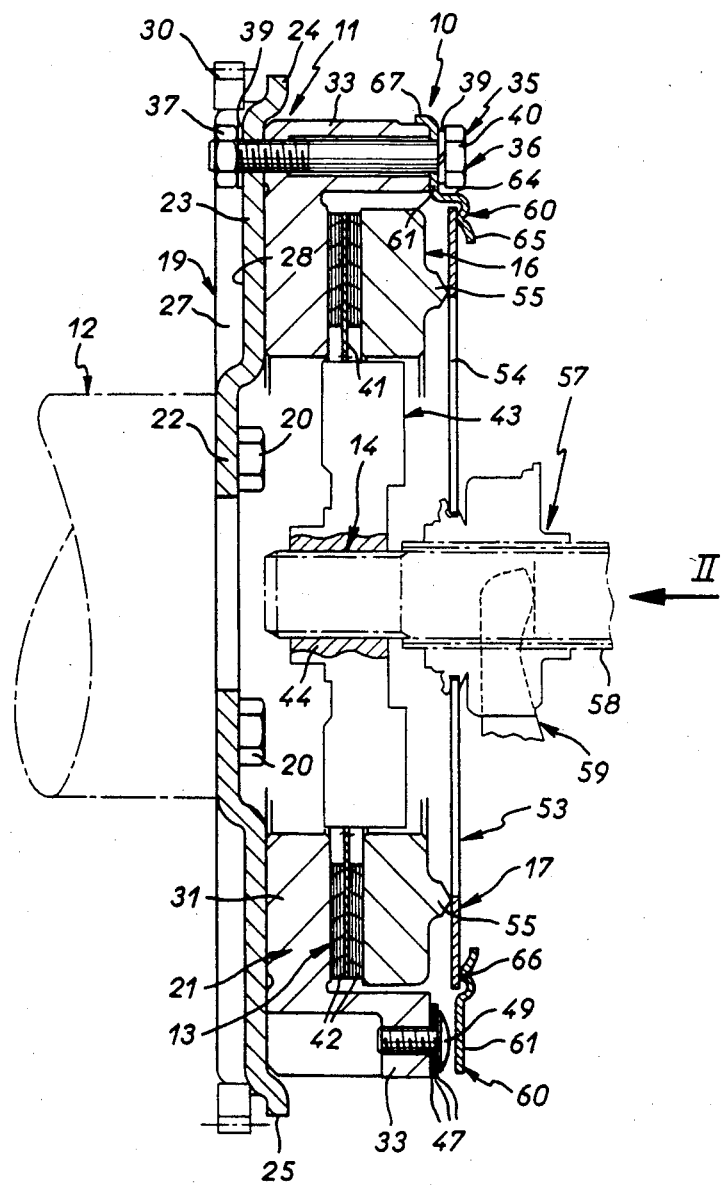
FIG. 1 is a view in axial cross-section of a clutch in accordance with the invention on the broken line I—I in FIG. 2.
Figure 2:
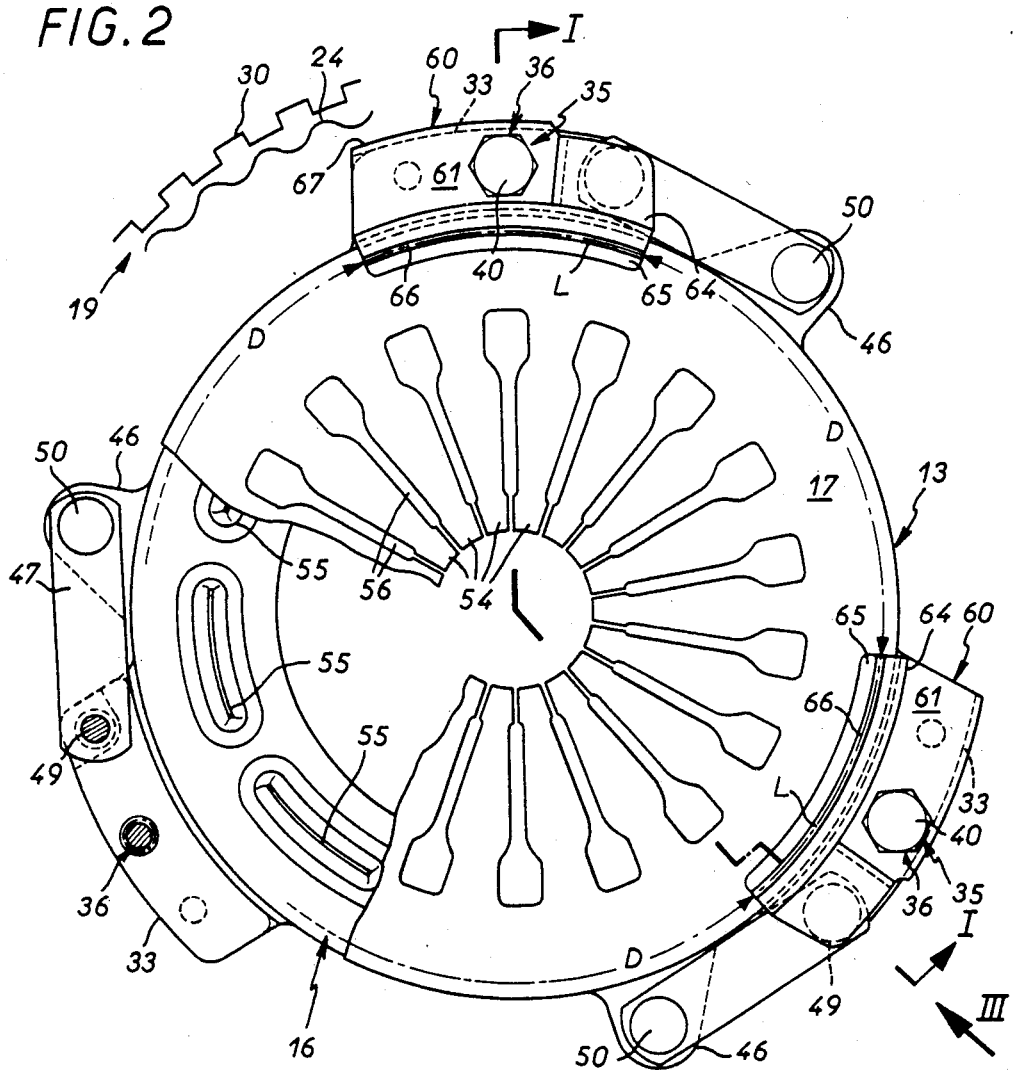
FIG. 2 is a partially cutaway view of it in elevation in the direction of the arrow II in FIG. 1.
Figure 3:
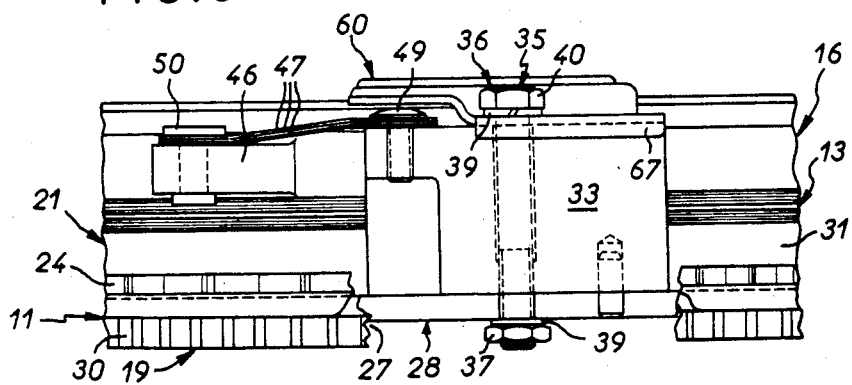
FIG. 3 is a partially cutaway partial view of it in side elevation in the direction of the arrow III in FIG. 2.

Overall, a clutch 10 of this kind, which is designed to be fitted to an automobile vehicle, comprises a first plate 11, called the reaction plate or flywheel, which is designed to be constrained to rotate with a first shaft, in practice the output shaft 12 of the motor of the automobile vehicle, as schematically represented in chain-dotted line in FIG. 1, a friction disk 13 which is designed to be constrained to rotate with a second shaft, in practice the input shaft 14 of the gearbox of the automobile vehicle, as also represented schematically in chain-dotted line in figure 1, a second plate 16, called the pressure plate, constrained to rotate with the reaction plate 11 and mounted so as to be axially mobile relative to the latter, axially acting elastic means 17, to be described in more detail hereinafter, which are adapted to urge the pressure plate 16 towards the reaction plate 11, and bearing means, also to be described in more detail hereinafter, which are fast with the reaction plate 11 in the axial direction and provide axial bearing support to said axially acting elastic means 17.

In the embodiment shown, the reaction plate 11 which is overall a generally annular part comprises two separate parts appropriately fastened together, in the form of a first part constituting a support flange 19 through which it is adapted to be attached to the output shaft 12, or crankshaft, or the motor of the vehicle concerned, as by set screws 20, for example, as shown here, and second part forming a reaction plate proper 21 through which it is adapted to cooperate with the friction disk 13.

In the embodiment shown the support flange 19 features, sucessively offset axially relative to one another, an inside radial part 22 through which pass the screws 20, a median radial part 23 against which the reaction plate proper 21 bears in the axial direction, and an outside radial part 24 which forms a timing marker 25.

By virtue of radial stamped portions 27 which are substantially in line with its inside part 22 and between pairs of which are formed radial recesses 28 the median part 23 of the support flange 19 itself carries at its periphery, parallel to the timing marker 25, a toothed ring 30 forming a starter ring, which is appropriately attached to it, as by welding, for example.

In the embodiment shown, the reaction plate proper 21 comprises a transverse annular part 31 with which the friction disk 13 cooperates and, in one piece with and at the periphery of this annular part 31, an axial cylindrical side wall.

In this embodiment, this wall is circumferentially subdivided into a plurality of distinct seatings 33 which, projecting both radially and axially relative to the annular part 31, are circumferentially spaced around the annular part 31 and in one piece therewith.

In practice, three seatings 33 regularly spaced in the circumferential direction are provided in the embodiment shown.

Fixing means are also provided to fasten together the two parts constituting the reaction plate 11.

In the embodiment shown these are nut-and-bolt fasteners 35, of which there is one for each seating 33 of the reaction plate proper 21, the bolts 36 of which pass axially through said seatings and the median part 23 of the support flange 19 and the nuts 37 of which are advantageously accommodated within the radial recesses 28 formed between the stamped portions 27 of said median part 23 of the support flange 19.

As will be understood, and as is shown here, a locking washer 39 may be provided under the head 40 of the bolt 36 and under the associated nut 37.

In a manner which is known per se, the friction disk 13 comprises, on respective sides of a support flange 41, two friction facings 42, one to cooperate with the reaction plate 11 and the other to cooperate with the pressure plate 16. Through the intermediary of a torsional damper device 43 of which only the contour is schematically represented in FIG. 1, the support flange 41 is carried on a hub 44 through which it is constrained to rotate, as by a splined coupling, for example, with the input shaft 14 of the associated gearbox.

In practice, and as shown here, the friction disk 13 extends transversely within the internal volume defined by the seatings 33 of the reaction plate proper 21.

The same applies to the pressure plate 16.

In a manner which is known per se, the pressure plate 16 forms a generally annular part with spaced radial lugs 46 projecting from its outside periphery, one for each seating 33 of the reaction plate proper 21. It is constrained to rotate with the reaction plate proper 21 by elastically deformable strips 47 which are disposed substantially transversely relative to the axis of the clutch and extend substantially tangentially relative to the circumference of the clutch. Stacked in groups of three in the embodiment shown, these strips are coupled at one end to the reaction plate proper 21 and at the other end to the pressure plate 16.

In practice, three groups of elastically deformable strips 47 are provided in the embodiment shown, one for each seating 33 of the reaction plate proper 21, and each of these groups of elastically deformable strips 47 is fastened by a screw 49 to the corresponding seating 33 of said reaction plate proper 21 and by a rivet 50 to the corresponding radial lug 47 of the pressure plate 16.

Finally, in a manner also known per se, the axially acting elastic means 17 employed form the circumferentially continuous peripheral part, constituting a Belleville spring, of a generally annular part 53 called a diaphragm spring which extends generally transversely relative to the axis of the assembly and the central part of which is divided into radial fingers 54 by slots 56.

In practice, the pressure plate 16 features axially projecting bosses 55 disposed annularly on a common circumference of the clutch for the diaphragm spring 53 to act on. Since the clutch is of the pull type, said diaphragm spring 53 bears on the bosses 55 at the inside periphery of its periphery part forming the axially acting elastic means 17.

Conjointly, and as schematically represented in chain-dotted line in FIG. 1, the ends of the radial fingers 54 of the diaphragm spring 53 are engaged on a clutch release bearing 57 which, for example and as shown here, is slidably mounted on a guide sleeve 58 annularly surrounding with clearance the input shaft 14 of the associated gearbox and which is operated by a clutch release yoke 59.

As these arrangements do not individually constitute part of the present invention and as at least certain of them are well known per se, they will not be described in more detail here.

In accordance with the invention, and in conjunction with the use of the circumferentially continuous peripheral part, constituting a Belleville spring, of a diaphragm spring 53 in order to constitute the axially acting elastic means 17, the bearing means associated with said axially acting elastic means 17 comprise a plurality of distinct circumferentially elongate segments 60 circumferentially distributed around the axis of the clutch and individually attached to the reaction plate 11, more precisely to the reaction plate proper 21 forming part of the latter.

In practice, the circumferential distance D between the segments 60 is greater than their length L in the circumferential direction.

In the embodiment shown, three segments 60 are therefore provided, one for each seating 33 of the reaction plate proper 21, and these segments 60 are all similar and regularly distributed circumferentially around the axis of the assembly.

Furthermore, in the embodiment shown, each segment 60 comprises a plate 61 which extends transversely to the surface of the corresponding seating 33 of the reaction plate proper 21, by means of which it is coupled to this seating 33.

In the embodiment shown, the fixing means which fasten together the two parts constituting the reaction plate 11 also fasten the segments 60 to the latter.

In practice, each of the bolts 36 constituting part of these fixing means passes through the plate 61 of the corresponding segments 60, thus holding the latter against the edge of the corresponding seating 33 by its head 40.

However, it will be understood that as an alternative to this each segment 60 may be fastened to the reaction plate proper 21, more precisely to the corresponding seating 33 of the latter, by fixing means distinct from those fastening said reaction plate proper 21 to the support flange 19 (not shown in the figures).

In the latter case, it is advantageously possible to pre-assemble the constituent parts of the clutch 10 other than the support flange 19 as a unit assembly, usually referred to as a clutch cover assembly.

In the embodiment shown, each segment 60 comprises, in radial sucession from the plate 61 towards the axis of the assembly, a substantially axial part 64 extending around the diaphragm spring 53 and contributing to the centering of the latter and a substantially radial part 65 providing local axial bearing support for the side of the diaphragm spring 53 facing away from the pressure plate 16, said radial part 65 being shaped appropriately to provide such support and featuring to this end, for example and as shown here, a stamped arcuate bead 66 projecting axially in the direction towards the pressure plate 16.

In practice, it is along said arcuate bead 66 that the circumferential length previously mentioned is measured.

On the side of its plate 61 radially opposite its axial part 64, each segment 60 further features at its outside periphery, in the embodiment shown, in contact with the cylindrial side wall of the reaction plate 11 and thus, in practice, in contact with the outside surface of the corresponding seating 33 of the reaction plate proper 21, a flanged edge 67 which centers it on the seating 33 and prevents it rotating relative to the latter. In practice it is directed in the axial direction opposite that of its axial section 64.

Finally, in the embodiment shown, at least one of the segments 60 (and in practice each of them) extends circumferentially in line with the end at which the corresponding elastically deformable strips 47 are attached to the pressure plate 16.

Because of this, the plate 61 of a segment 60 is formed of two circumferential sections which are axially offset relative to one another, namely a first section through which it actually bears on the edge of the corresponding seating 33 of the reaction plate proper 21 and, axially offset relative to this edge, cantilever-fashion in relation to the aforementioned section, a second section which extends axially over the screw 49 fastening the corresponding elastically deformable strips 47 to said seating 33.

This arrangement has the advantage, on the one hand, of preventing any access to the screw 49 and, on the other hand, other things being equal, of enabling the usuable part of a segment 60 to be commensurately extended in the circumferential direction, this part being the transverse section 65 through which it provides support for the diaphragm spring 53.

In practice, in the embodiment shown, the flanged edge 67 is interrupted in line with the thus axially offset section of the plate 61 of each segment 60 and, in this embodiment, it therefore extends circumferentially over part only of the length of the latter.

The support flange 19 being fastened in advance by the screws 20 to the end of the shaft 12 of the motor of the vehicle to be equipped, the assembly is mounted by fastening the various constituent parts to the support flange 19 using the nut-and-bolt fasteners 35.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. Clutch comprising a reaction plate adapted to be constrained to rotate with a first shaft, a friction disk adapted to be constrained to rotate with a second shaft, elastically deformable strips extending tangentially to a circumference of the clutch and fastened at one end to said reaction plate and at the other end to a pressure plate for constraining said pressure plate to rotate with said reaction plate, axially acting elastic means adapted to urge said pressure plate towards said reaction plate, and bearing means fast with said reaction plate in the axial direction on which said axially acting elastic means bear axially, wherein said axially acting elastic means comprise the circumferentially continuous part of a diaphragm spring constituting a Belleville spring and said bearing means comprise a plurality of distinct, circumferentially elongate segments distributed circumferentially around the axis of the clutch and each individually attached to said reaction plate, at least one of said segments extends circumferentially in line with the end by which a corresponding one of said elastically deformable strips is attached to said reaction plate, said reaction plate comprising a first part constituting a support flange by means of which it is adapted to be attached to said first shaft, and a second part constituting the reaction plate proper by means of which it is adapted to cooperate with said friction disk, and each of said segments having a plate which comprises a first circumferential part through which it bears on the reaction plate and a second circumferential part axially offset from and projecting cantilever-fashion from said first circumferential part extending axially over a screw fixing the end of the corresponding elastically deformable strip to the reaction plate.

2. Clutch according to claim 1, wherein the circumferential distance between said segments is greater than their length in the circumferential direction.

3. Clutch according to claim 1, wherein said reaction plate comprises at its periphery generally part cylindrical side wall portions and each of said segments has over at least part of its length an edge flange in contact with one of said cylindrical side wall portions.

4. Clutch according to claim 1, wherein said reaction plate comprises a first part constituting a support flange by means of which it is adapted to be attached to said first shaft, and a second part constituting the reaction plate proper by means of which it is adapted to cooperate with said friction disk, further comprising fixing means attaching together said first and second parts and also attaching said segments to said reaction plate.

5. Clutch according to claim 1, including fixing means attaching together said first and second parts and attaching each of said segments to said second part of said reaction plate.

6. Clutch according to claim 1, wherein said second part of said reaction plate is of one piece comprising an annular part and generally part cylindrical side wall projecting axially from said annular part and being divided into a series of circumferentially distributed seatings and wherein the plate of each of said segments extends transversely to the surface of a respective seating and is attached to said seating.

7. Clutch according to claim 6, wherein each of said segments comprises, in succession from said plate towards the axis of the clutch, a substantially axial part surrounding said diaphragm spring and contributing to the centering thereof and a substantially radial part offering local axial bearing support to the side of said diaphragm spring opposite said pressure plate.

8. Clutch according to claim 7, wherein said substantially radial part of each of said segments has an arcuate bead projecting axially towards said pressure plate for said diaphragm spring to bear on.

9. Clutch according to claim 1, wherein said reaction plate comprises at its periphery generally part cylindrical side wall portions and each of said segments has over at least part of its length an edge flange in contact with one of said cylindrical side wall portions and wherein said flanged edge of each segment is interrupted in line with said second part of each of said plates whereby it extends circumferentially over part only of the length of said segment.

* * * * *